United States Patent
Tran

(10) Patent No.: US 8,717,790 B2
(45) Date of Patent: May 6, 2014

(54) ELECTRICAL SUPPLY APPARATUS

(71) Applicant: Diehl Aerospace GmbH, Ueberlingen (DE)

(72) Inventor: Trong Tran, Erlangen (DE)

(73) Assignee: Diehl Aerospace GmbH, Ueberlingen (DE)

( * ) Notice: Subject to any disclaimer, the term of this patent is extended or adjusted under 35 U.S.C. 154(b) by 0 days.

(21) Appl. No.: 13/826,959

(22) Filed: Mar. 14, 2013

(65) Prior Publication Data

US 2013/0279217 A1 Oct. 24, 2013

(30) Foreign Application Priority Data

Mar. 22, 2012 (DE) .......................... 10 2012 005 854

(51) Int. Cl.
*H02M 5/42* (2006.01)
*H02M 3/156* (2006.01)

(52) U.S. Cl.
USPC .............................. 363/82; 363/125; 323/284

(58) Field of Classification Search
USPC ................ 363/44, 81, 82, 125, 126; 323/222, 323/282–290
See application file for complete search history.

(56) References Cited

U.S. PATENT DOCUMENTS

| | | | | |
|---|---|---|---|---|
| 5,003,454 A | * | 3/1991 | Bruning | 363/81 |
| 7,221,121 B2 | * | 5/2007 | Skaug et al. | 318/807 |
| 7,397,678 B2 | * | 7/2008 | Frank et al. | 363/89 |
| 2005/0018458 A1 | * | 1/2005 | Shimada et al. | 363/125 |
| 2011/0089844 A1 | * | 4/2011 | Grajcar | 315/193 |

FOREIGN PATENT DOCUMENTS

DE 10 2006 044 879 A1 4/2008
EP 0 991 169 A2 4/2000

OTHER PUBLICATIONS

English Abstract of WO2008034515 A1, dated Mar. 27, 2008 (corresponding to DE10 2006 044 879).

* cited by examiner

*Primary Examiner* — Jessica Han
(74) *Attorney, Agent, or Firm* — Scully, Scott, Murphy & Presser P.C.

(57) ABSTRACT

The present invention is directed to an electrical supply apparatus having an input for connecting the electrical supply apparatus to a mains supply which provides an alternating voltage as input voltage, having an output for connecting the electrical supply apparatus to a load, wherein the output provides a DC voltage as output voltage, having a rectifier which rectifies the input voltage to form a rectified input voltage, having a PFC module which comprises a smoothing device for smoothing the rectified input voltage and an active power factor correction device, wherein the power factor correction device is designed to form a time-dependent supply current for the smoothing device depending on a time-dependent current form signal in such a way that a time-dependent input current in the PFC module is matched to the current form signal, wherein the current form signal is produced by an analogue circuit.

10 Claims, 3 Drawing Sheets

ELECTRICAL SUPPLY APPARATUS

BACKGROUND OF THE INVENTION

The invention relates to an electrical supply apparatus having an input for connecting the electrical supply apparatus to a mains supply which provides an alternating voltage as input voltage, having an output for connecting the electrical supply apparatus to a load, wherein the output provides a DC voltage as output voltage, having a rectifier which rectifies the input voltage to form a rectified input voltage, having a PFC module which comprises a smoothing device for smoothing the rectified input voltage and an active power factor correction device, wherein the power factor correction device is designed to form a time-dependent supply current for the smoothing device depending on a time-dependent current form signal in such a way that a time-dependent input current in the PFC module is matched to the current form signal, and having a control module which produces the current form signal for the PFC module, in particular for the power factor correction device.

DISCUSSION OF THE PRIOR ART

In order to supply electrical loads from a supply network, use is normally made of power supplies, which in many embodiments produce a DC voltage for the load from an alternating voltage as mains voltage from the supply network.

However, with sinusoidal mains voltages of the supply network, phase-shifted and non-sinusoidal mains currents, which can cause disturbances in the supply network, often occur. In this situation, the instantaneous value of the mains current in the supply network is not proportional to the instantaneous value of the mains voltage. While the normally sinusoidal mains voltage remains sinusoidal as an impressed quantity, the form of the mains current of the supply network can be changed. This leads to the so-called power factor, which designates the ratio of the magnitude of the active power P to the magnitude of an apparent power S, varying from its ideal value 1.

Power Factor Correction or Power Factor Compensation modules (abbreviated to PFC) are normally used to improve the power factor. These power factor correction modules have the task of compensating a non-proportional current consumed by loads and, in the event of an active power factor correction, at the same time as achieving a compensation of the reactive power in that the mains current is matched to the mains voltage in phase and in form. Power factor correction modules of this kind are also referred to as power factor correction filters or as harmonic filters.

Publication DE 10 2006 044 879 A1, which forms the closest prior art, describes a power supply apparatus having a control unit which is designed to match a current characteristic to a voltage characteristic. Matching is achieved by at least one active unit having at least one connectable unit.

SUMMARY OF THE INVENTION

It is the object of the present invention to create an electrical supply apparatus which keeps the load on the supply network low and, at the same time, is easy to implement. This object is achieved by an electrical supply apparatus with the characteristics of claim 1. Preferred or advantageous embodiments of the invention can be seen from the dependent claims, the following description and the attached figures.

The invention therefore relates to an electrical supply apparatus which, in particular, is designed as a power supply. The power supply can be designed, for example, for operation in an aircraft to supply lighting devices, such as cabin lighting for example.

In this exemplary embodiment, the electrical supply apparatus has an output power of >5 Watt, preferably >10 Watt and in particular >15 Watt and/or <500 Watt, preferably <300 Watt and in particular <200 Watt. Another advantageous application of the invention is the design as a power supply for a laptop.

The electrical supply apparatus has an input for connecting the electrical supply apparatus to a mains supply. In the case of a power supply for use in an aircraft, the mains supply can have an RMS voltage of 115 Volt and a mains frequency of 400 Hertz to 800 Hertz for example. When connecting to a conventional mains supply, the input has an RMS voltage of 230 Volt and a mains frequency of 50 Hertz. In general, the mains supply provides an alternating voltage as input voltage Uin.

The electrical supply apparatus comprises an output for connecting the electrical supply apparatus to a load, wherein the output provides a DC voltage as output voltage Uout. In the example as a power supply for an aircraft, the load can be in the form of one or more lighting devices, in particular LED devices. The output voltage Uout can lie between 200 Volt and 250 Volt for example. In the example of a power supply for a laptop, the output voltage Uout can lie between 10 and 20 Volt for example.

The electrical supply apparatus has a rectifier which rectifies the input voltage Uin to form a rectified input voltage Upfc. Rectifiers of this kind are sufficiently well-known, in particular the rectifier can be a bridge rectifier.

The electrical supply apparatus comprises a PFC module which comprises a smoothing device for smoothing the rectified input voltage and an active power factor correction device. The active power factor correction device can also be described as an active harmonic filter. The smoothing device can be in the form of a storage capacitor, for example, from which the output voltage Uout can be tapped off. The power factor correction device is designed to form a time-dependent supply current for the smoothing device depending on a time-dependent current form signal in such a way that a time-dependent input current Ipfc in the PFC module is matched to the current form signal. The supply current for the smoothing device will often have a jagged, stepped or otherwise deformed characteristic. On the other hand, the time-dependent input current Ipfc has a characteristic which is matched to the curve progression of the current form signal. As a result, the time-dependent input current Ipfc is matched to the time-dependent input voltage Uin or to the rectified input voltage Upfc by the power factor correction unit.

The electrical supply apparatus further comprises a control module which produces the current form signal for the PFC module, in particular for the power factor correction device.

Within the framework of the invention, it is proposed that the control module is in the form of an analogue circuit which has the rectified input voltage Upfc as input signal and the current form signal as output signal. The rectified input voltage Upfc has a waveform, in particular a half-wave, with a rising and a falling input voltage edge and with an input voltage maximum between the edges. In particular, the waveform is in the form of a half-wave of a sinusoidal oscillation. The current form signal has a waveform with a rising and a falling current form edge and with a current form maximum between the edges.

The control module, in particular the analogue circuit, is designed so that the waveform is changed, wherein, at least in some regions, the rising current form edge is set back with respect to the rising input voltage edge to a greater extent than the current form maximum with respect to the input voltage maximum. Alternatively, or in addition, the waveform is changed so that, at least in some regions, the falling current form edge is set back with respect to the falling input voltage edge to a greater extent than the current form maximum with respect to the input voltage maximum.

In another representation—insofar as the two waveforms are distended so that their maxima have the same amplitude—at least one of the current form edges is reduced in amplitude, at least in some regions, compared with the corresponding input voltage edge.

At the same time, it is a consideration of the invention that HF filters—also referred to as mains filters—are often used to damp disturbances in the mains voltage which arise as a result of the power factor correction device. The disturbances are due to the fact that power factor correction devices work in a switching mode and switch several times in each half wave in order to match the time-dependent input current to the current form signal. HF filters are preferably designed as low-pass filters and/or as a combination of capacitors and inductors.

However, further disturbances, which lead especially to a reduction in the power factor, arise due to the HF filters, in particular harmonic distortion (THD) in the mains voltage. In order to counteract this negative effect, the waveform of the current form signal is not reproduced as being identical to the waveform of the rectified input voltage but is shown distorted. In particular, with the rising current form edge, the slope at the beginning of the rising current form edge is less than the slope of the rising input voltage edge. At the peak value, the current form signal approximates to the rectified input voltage. This reduces or damps high frequencies in the region of the zero crossover which produce severe distortion due to the high switching frequencies of the power factor correction device.

At the same time, implementation in the form of an analogue circuit can be realised cost effectively, thus enabling the overall power of the electrical supply apparatus to be improved with low circuit complexity.

In a particularly simple circuit implementation, it is provided that the control module, in particular the analogue circuit, is designed so that the current form maximum is equal to the input voltage maximum. In this embodiment, the peak values of the two waveforms therefore lie on top of one another viewed in the time direction and have the same amplitude. At this point in time, the control module, in particular the analogue circuit, acts as a low-resistance cable.

Alternatively, or in addition, it is particularly preferred that the zero crossovers or minima of input voltage and current form signal are arranged to overlap in time. On the one hand, this ensures that the current form signal and the rectified input voltage are synchronized in time with respect to one another and, on the other, are arranged with respect to one another without phase shift.

In a preferred circuit implementation of the invention, the control module has a plurality of branches which are connected in parallel between input signal and output signal and which are activated successively for a rising input signal edge and/or deactivated successively for a falling input signal edge as a function of the rectified input voltage. In particular, at least one resistor is arranged in most or in each of the branches.

In a preferred embodiment of the invention, the branches each have a Zener diode or Z-diode and, in addition, a resistor, wherein the Zener diodes or Z-diodes are designed and connected so that they become successively low resistance for a rising input signal edge and/or successively high resistance for a falling input signal edge as a function of the rectified input voltage. Consequently, as the input voltage rises for a rising input signal edge, branches are connected successively, wherein the branches are arranged in parallel with one another. A resistor is arranged in each of the branches so that, by connecting further branches, the total resistance becomes gradually smaller. As a result, as regards the amplitude, the waveform of the outgoing current form signal is initially less than the input signal voltage. However, a multiplicity of branches with resistors are connected in parallel in the vicinity of the input voltage maximum so that the total resistance becomes very small or, with appropriate design, even reduces to zero, so that the current form maximum corresponds to the input voltage maximum. On the falling input signal edge, the branches are deactivated successively in the reverse order, so that the total resistance also rises. As a result, the amplitude of the falling current form edge is less than the falling input voltage edge. The two curves come together again at a zero crossover and are coincident. This embodiment is easy to implement from a circuit point of view and allows the invention to be realised cost effectively.

In a preferred design embodiment of the invention, the PFC module comprises a choke, in particular a storage choke, a switching element, in particular a transistor, and a driver IC, wherein the input current is fed through the choke, the switching element pulls the output of the choke to ground as a function of its switch position, the driver IC receives the current form signal as input signal and drives the switching element. A PFC module of this kind is simple and robust in its design.

In a first possible embodiment of the invention, the PFC module is used in a DCM (Discontinuous Current Mode) mode, wherein the supply current after the choke returns to zero within each switching cycle of the switching element. The switching frequency is constant so that, in this operating mode, the PFC module works discontinuously.

Alternatively, the PFC module works in a CCM (Continuous Current Mode) mode, wherein the switching frequency is preferably constant and the supply current after the choke progresses in a sawtooth manner about the current form signal.

Alternatively, the PFC module works in a CRM (Critical Conduction Mode) mode, wherein the switching frequency is variable and adjusted so that the next switching cycle begins as soon as the supply current after the choke becomes zero, so that the PFC module is operated at the limit of discontinuity.

As already mentioned above, the high frequencies of the switching mode of the switching element lead to disturbances in the mains supply. Particularly serious are the disturbances with the CRM method, as these have very high switching frequencies in the region of the zero crossover of the rectified input voltage, so that the invention can be used particularly advantageously in conjunction with the CRM mode.

In a particularly easily designed variant of the invention from the circuit point of view, the smoothing device is in the form of at least one capacitor. Especially, the capacitor connects the poles of the output.

BRIEF DESCRIPTION OF THE DRAWINGS

Further characteristics, advantages and effects of the invention can be seen from the following description of a preferred exemplary embodiment of the invention and the attached figures. In the drawings.

DETAILED DESCRIPTION OF THE INVENTION

Figure 1:
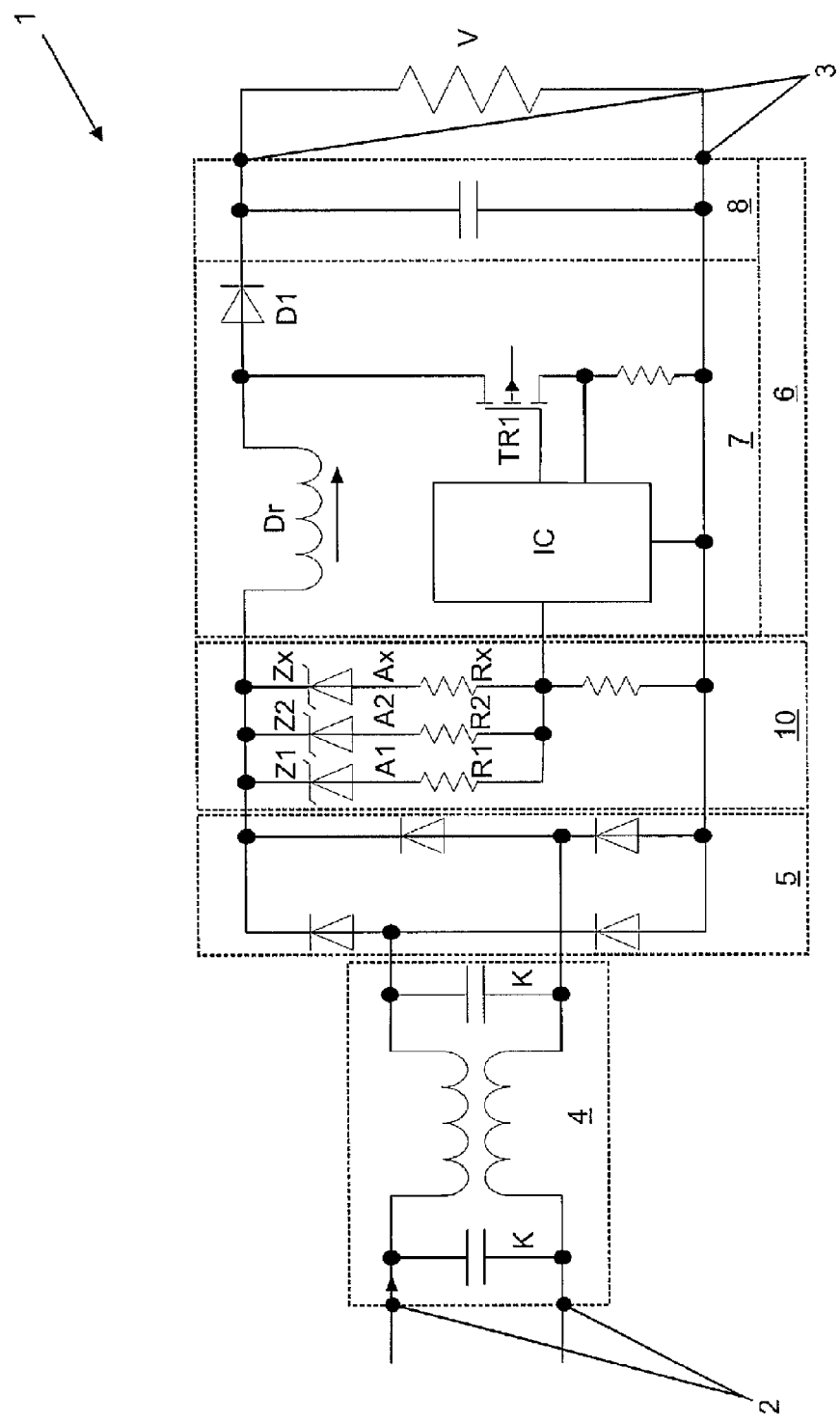
FIG. 1 shows a block circuit diagram of an electrical supply apparatus as an exemplary embodiment of the invention.

FIG. 1 shows, in a schematic block diagram, a power supply 1, for example for a lighting system of an aircraft, as an exemplary embodiment of the invention, which forms an electrical supply apparatus. The power supply 1 has a power between 20 Watt and 200 Watt and is used in the aircraft to supply a load V, such as lighting devices for example (not shown), in particular LED lighting devices, for illuminating the interior of the aircraft. Alternatively, the power supply is designed for a laptop or some other small electrical device and has a power between 5 Watt and 30 Watt.

The power supply 1 has an input 2 to which the power supply 1 can be connected to the supply network, e.g. of the aircraft. The supply network provides an input voltage and a mains current. The input voltage is in the form of a sinusoidal alternating voltage and, for the example in the aircraft, has a frequency between 400 Hertz and 800 Hertz and an RMS input voltage of 115 V. In a different mains supply, the RMS mains voltage can be 230 V and the frequency 50 Hertz.

The power supply 1 has an output 3 and can be or is connected to the load V, in particular to the lighting devices in the aircraft or to the laptop or similar. The output voltage is a direct voltage which is between 200 Volt and 250 Volt, for example, for the example of the LED lighting devices, or 15 V for the laptop or similar.

Starting from the input 2, an HF filter 4, which is designed to filter high frequencies, is arranged downstream. In a specific embodiment, the HF filter 4 can have at least one capacitor K. In particular, the HF filter 4 is in the form of a mains filter.

A rectifier 5, which converts the input voltage into a rectified input voltage, is arranged after the HF filter 4. For example, the rectifier 5 is in the form of a bridge rectifier or full-wave rectifier. The rectified input voltage is a pulsed DC voltage, wherein—seen graphically—parts of the input voltage, which are in the negative voltage range are reflected about the X-axis. The pulsed, rectified input voltage therefore has twice the frequency of the input voltage. The current flowing in this region is referred to as the input current.

The rectified input voltage is subsequently fed to a PFC module 6 which has a power factor correction device 7 and a smoothing device 8.

The smoothing device 8 is used to convert the pulsed rectified input voltage into the output voltage with constant voltage level. The smoothing device 8 can be shown as a capacitor as part of an equivalent circuit diagram.

Figure 2:
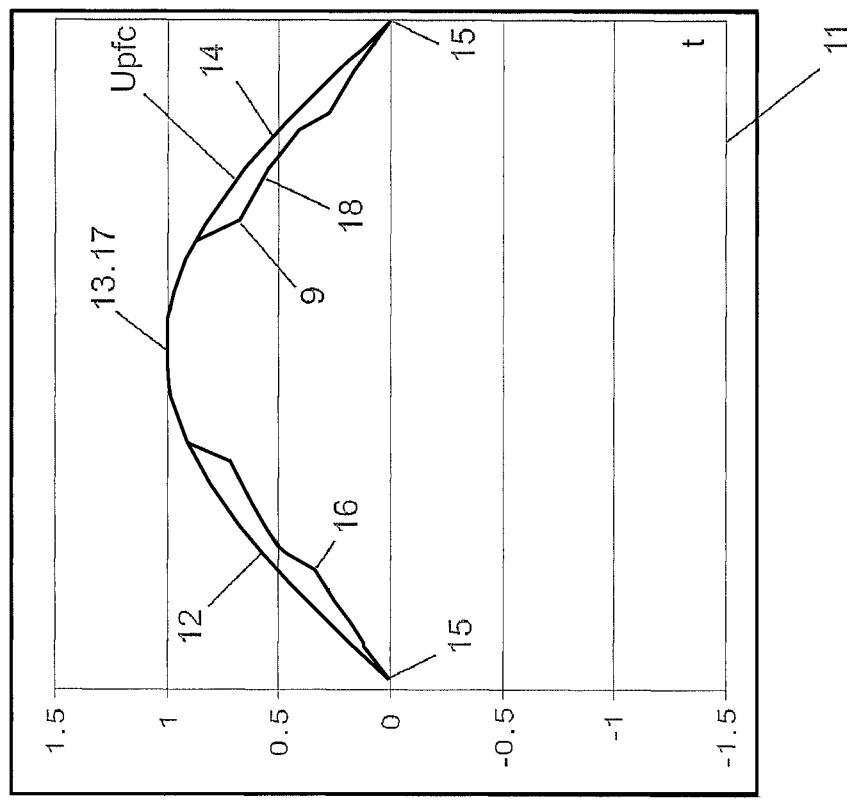
FIG. 2 shows a graph to illustrate the principle of operation of the electrical supply apparatus in FIG. 1.

The power factor correction device 7 is used to match the input current in the PFC module 6 to the rectified input voltage. At the same time, matching is carried out to improve the power factor in the region of the mains supply, that is to say in the region of the input 2. The power factor correction device 7 enables this in that the supply current which is fed to the smoothing device 8 is modulated so that the input current in the PFC module 6 is matched to a specified current form signal 9 (FIG. 2). The current form signal 9 is produced in a control module 10 which is explained below.

The control module 10 is in the form of an analogue circuit and has an input which is connected to an output of the rectifier 5. A first output of the control module 10, which is linked through from the input, is conductively connected to the power factor correction device 7. On the other hand, a second output of the control module 10 transfers the current form signal 9 to the power factor correction device 7. In the control module 10, a plurality, in this example 3 or more, branches A1, A2 . . . Ax are arranged with respect to one another in a parallel circuit between input and second output. A Z-diode Z1, Z2 . . . Zx and an ohmic resistor R1, R2 . . . Rx are in each case arranged in each of the branches A1, A2 . . . Ax. The Z-diodes Z1, Z2 . . . Zx are implemented differently in such a way that they switch from a high-resistance state to a low-resistance state at different voltage levels. In particular, the breakdown voltages of the Z-diodes Z1, Z2 . . . Zx are chosen differently. For a rising voltage edge, the Z-diode Z1 therefore switches from the high-resistance state to the low-resistance state first, the Z-diode Z2 at a later point in time, etc.

The principle of operation of the switching module 10 is explained below based on the graph 11 according to FIG. 2, wherein a time t is shown on the X-axis and a signal amplitude in arbitrary units normalized to 1 is shown on the Y-axis. The continuous line shows the rectified input voltage Upfc applied to the input of the control module 10. The waveform of the rectified input voltage Upfc shows a rising input voltage edge 12, an input voltage maximum 13 and a falling input voltage edge 14.

Because of the parallel connections of the Z diodes Z1, Z2 . . . Zx, starting from the zero crossover of the rectified input voltage Upfc, the current form signal 9, which is also shown, is initially zero until the first Zener diode Z1 switches and a voltage is present at the second output. Because of the interposed resistor R1, this voltage rises rather more weakly than the rectified input voltage Upfc. At a later point in time, the second Z-diode Z2 switches so that the total resistance formed by the reciprocal value of R1 plus R2 reduces. At an even later point in time, the Z-diode Zx switches and the current form signal 9 becomes equal to the signal of the rectified input voltage Upfc due to the very low resistance Rx. As an option, the resistance Rx can also be zero. The amplitude of a rising current form edge 16 of the current form signal 9 is therefore less than the rising input voltage edge 12. A current form maximum 17 is at the same level as that of the input voltage maximum 13. The process is repeated in the reverse order on the falling input voltage edge 14, so that the amplitude of a falling current form edge 18 is less than the falling input voltage edge 14.

If the waveforms of the rectified input voltage Upfc and the current form signal 9 are considered, it can be seen that these are overlapping at the zero crossovers 15 and also have the same amplitude at the peak value or maximum. The amplitude of the current form signal 9 is however less than the amplitude of the rectified input voltage Upfc at the rising edges 12, 16 and at the falling edges 14, 18. This distorted output of the current form signal 9 compared with the rectified input voltage Upfc leads to the supply current being smaller, particularly at low amplitudes, so that disturbances of the mains supply are also reduced.

FIG. 1 shows the power factor correction device 7, wherein the latter and the inputs thereof are connected to the outputs of the rectifier 5. One of the inputs is fed via a choke device DR and a diode D1 to an output to the smoothing device 8. The other input is fed through the power factor correction device 7 to the smoothing device 8. The two connections are connected to one another within the power factor correction device 7 by means of a switching element TR1 which is driven by a driver IC IC. The driver IC IC is connected to the second output of the control module 10 so that the current form signal 9 is applied thereto.

The operation of the power factor correction device 7 is explained below based on FIGS. 3a to 3c which show different operating modes.

Figure 3A:
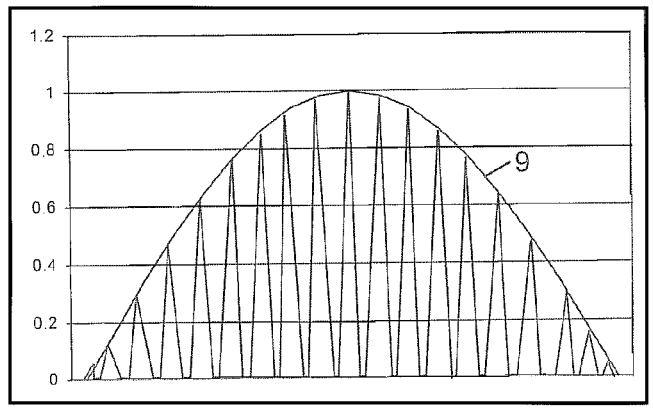
FIG. 3a, b, c show three graphs to illustrate different operating modes of the electrical supply apparatus in FIG. 1.

A graph to illustrate a DCM mode of the power factor correction device 7 is shown in FIG. 3a, wherein, on the one hand, the time-dependent characteristic of the current form signal 9 and, on the other, the supply current is shown. The power factor correction device 7 is designed so that the switching element TR1 is switched at a constant frequency. As soon as the supply current becomes greater than the current form signal 9, the switching element TR1 is closed so that the supply current returns to zero once within each switching cycle and remains at zero for the rest of the switching cycle. In this embodiment, the power factor correction device 7 works in discontinuous mode.

Figure 3B:
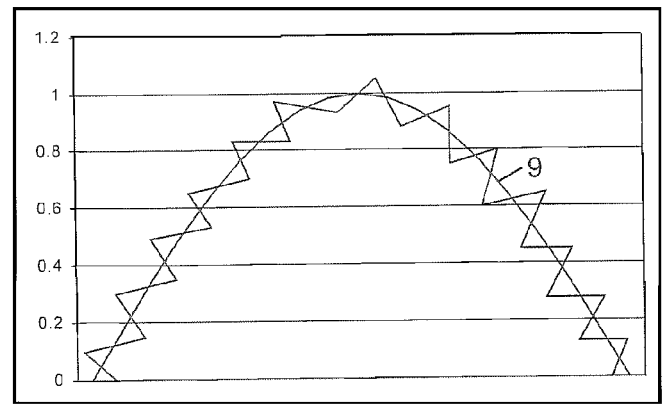

A CCM mode is shown in the same diagram in FIG. 3b, wherein, in this mode, the supply current progresses in a sawtooth manner around the current form signal 9.

Figure 3C:
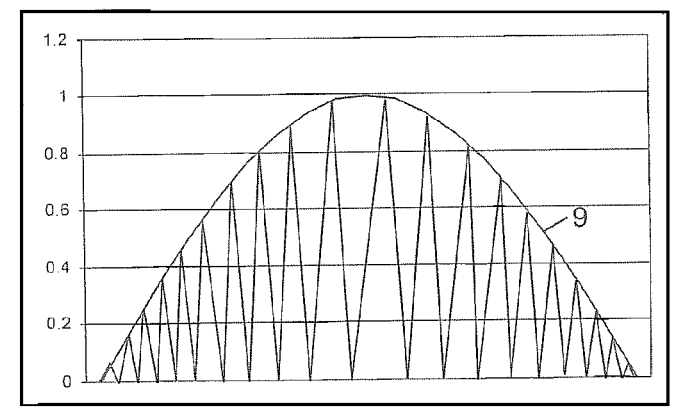

A CRM mode is shown in FIG. 3c, wherein, in this mode, the power factor correction device 7 is operated at the limit of discontinuity. In this mode, the next switching cycle begins immediately as soon as the supply current has been pulled to zero. As a result of this operating mode, the switching frequency is variable.

LIST OF REFERENCES

1 Power supply
2 Input
3 Output
4 HF filter
5 Rectifier
6 PFC module
7 Power factor correction device
8 Smoothing device
9 Current form signal
10 Control module
11 Graph
12 Rising input voltage edge
13 Input voltage maximum
14 Falling input voltage edge
15 Zero crossover
16 Rising current form edge
17 Current form maximum
18 Falling current form edge

What is claimed is:

1. An electrical supply apparatus
    having an input for connecting the electrical supply apparatus to a mains supply which provides an alternating voltage as input voltage (Uin),
    having an output for connecting the electrical supply apparatus to a load (V), wherein the output provides a DC voltage (Uout) as output voltage,
    having a rectifier which rectifies the input voltage (Uin) to form a rectified input voltage (Upfc),
    having a PFC module which comprises a smoothing device for smoothing the rectified input voltage (Upfc) and an active power factor correction device, wherein the power factor correction device is designed to form a time-dependent supply current for the smoothing device depending on a time-dependent current form signal in such a way that a time-dependent input current (Ipfc) in the PFC module is matched to the current form signal,
    having a control module which produces the current form signal for the PFC module, wherein
    the control module is in the form of an analogue circuit which has the rectified input voltage (Upfc) as input signal and the current form signal as output signal, wherein the rectified input voltage (Upfc) has a waveform with a rising and a falling input voltage edge and with an input voltage maximum, and the current form signal has a waveform with a rising and a falling current form edge and with a current form maximum, wherein, at least in some regions, the rising and/or the falling current form edge is set back with respect to the rising or falling input voltage edge to a greater extent than the current form maximum with respect to the input voltage maximum.

2. The electrical supply apparatus according to claim 1, wherein the current form maximum is equal to the input voltage maximum.

3. The electrical supply apparatus according to claim 1, wherein, the zero crossovers of input voltage (Uin) and current form signal are overlapping in time.

4. The electrical supply apparatus according to claim 1, wherein the control module has a plurality of branches (A1, A2 . . . Ax) which are connected in parallel and which are activated successively for a rising input signal edge and/or deactivated successively for a falling input signal edge as a function of the rectified input voltage (Upfc).

5. The electrical supply apparatus according to claim 4, wherein the branches (A1, A2 . . . Ax) each have a Zener diode or Z-diode (Z1, Z2 . . . Zx) which are designed and connected from a circuit point of view so that they become successively low resistance for a rising input signal edge and/or successively high resistance for a falling input signal edge as a function of the rectified input voltage (Upfc).

6. The electrical supply apparatus according to claim 1, wherein the PFC module comprises a choke (Dr), a switching element (TR1), and a driver IC (IC), wherein the input current is fed through the choke (Dr), the switching element (TR1) pulls the output of the choke (Dr) to ground as a function of its switch position, the driver IC (IC) receives the current form signal as input signal and drives the switching element (TR1).

7. The electrical supply apparatus according to claim 1, wherein the PFC module works in a Discontinuous Current Mode.

8. The electrical supply apparatus according to claim 1, wherein the PFC module works in a Continuous Current Mode.

9. The electrical supply apparatus according to claim 1, wherein the PFC module works in a Critical Conduction Mode.

10. The electrical supply apparatus according to claim 1, wherein the smoothing device is in the form of at least one capacitor.

* * * * *